(12) United States Patent
Yasunaga

(10) Patent No.: US 7,193,796 B2
(45) Date of Patent: Mar. 20, 2007

(54) PATTERNED MASTER CARRIER FOR MAGNETIC TRANSFER, MANUFACTURING METHOD THEREOF, MAGNETIC TRANSFER METHOD, RECORDING MEDIUM, AND MAGNETIC RECORDING AND REPRODUCTION APPARATUS

(75) Inventor: Tadashi Yasunaga, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 273 days.

(21) Appl. No.: 10/875,988

(22) Filed: Jun. 25, 2004

(65) Prior Publication Data

US 2004/0264024 A1    Dec. 30, 2004

(30) Foreign Application Priority Data

Jun. 26, 2003   (JP) .............................. 2003-182619

(51) Int. Cl.
*G11B 5/86* (2006.01)
(52) U.S. Cl. .......................................... 360/17; 360/16
(58) Field of Classification Search .................... None
See application file for complete search history.

(56) References Cited

U.S. PATENT DOCUMENTS

| | | | |
|---|---|---|---|
| 6,347,016 B1 | 2/2002 | Ishida et al. | |
| 6,441,981 B1 | 8/2002 | Cloke et al. | |
| 2002/0044368 A1 | 4/2002 | Yoshizawa | |
| 2003/0063403 A1* | 4/2003 | Nishikawa et al. | 360/17 |
| 2003/0123170 A1* | 7/2003 | Miyata et al. | 360/17 |

FOREIGN PATENT DOCUMENTS

| | | |
|---|---|---|
| EP | 0 353 767 A2 | 2/1990 |
| EP | 1 187 106 A2 | 3/2002 |
| JP | 2002-42301 A | 2/2002 |

OTHER PUBLICATIONS

Japanese Abstract No. 2001291234, dated Oct. 19, 2001.
Japanese Abstract No. 2000293839, dated Oct. 20, 2000.

* cited by examiner

*Primary Examiner*—Andrea Wellington
*Assistant Examiner*—Varsha A. Kapadia
(74) *Attorney, Agent, or Firm*—Sughrue Mion, PLLC

(57) ABSTRACT

A patterned master carrier for magnetic transfer is used to transfer a magnetization pattern, which does not cause a problem such as an error attributable to a subpulse upon signal reproduction, to a slave medium. A signal pattern on a surface of a patterned master carrier for the magnetic transfer includes signal areas and no-signal areas, and the signal area is provided with an actual signal pattern and a dummy signal pattern adjacent to the no-signal area. Therefore, the actual signal pattern is not adjacent to the no-signal area.

22 Claims, 4 Drawing Sheets

TRACK DIRECTION

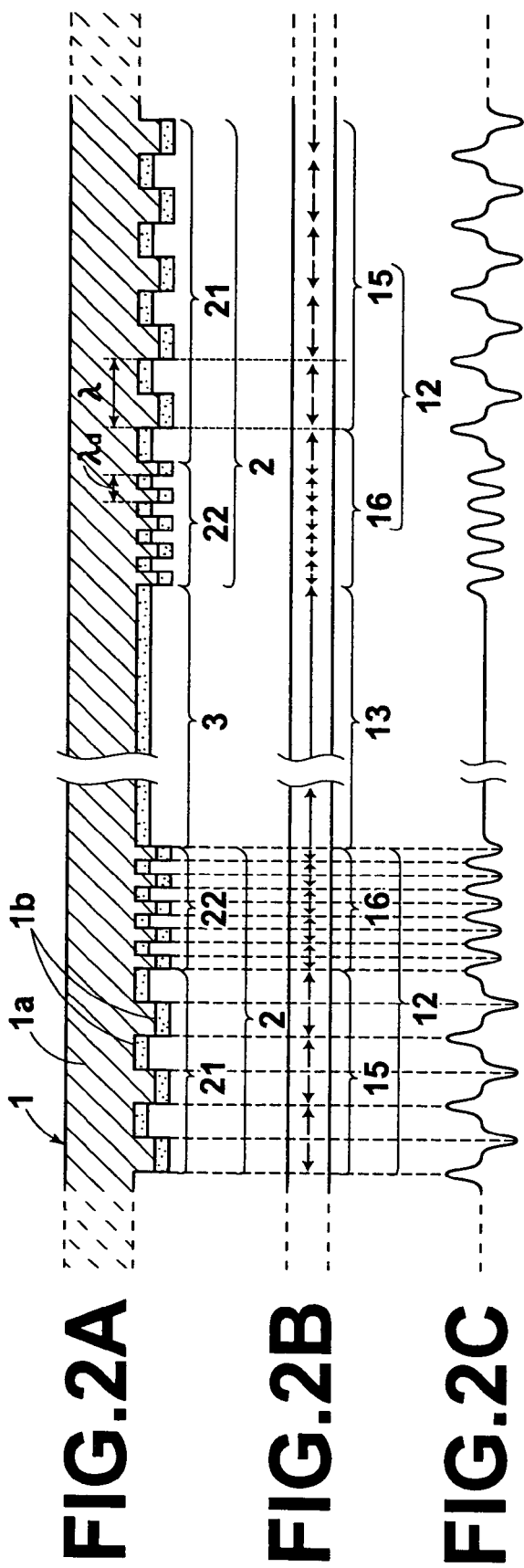

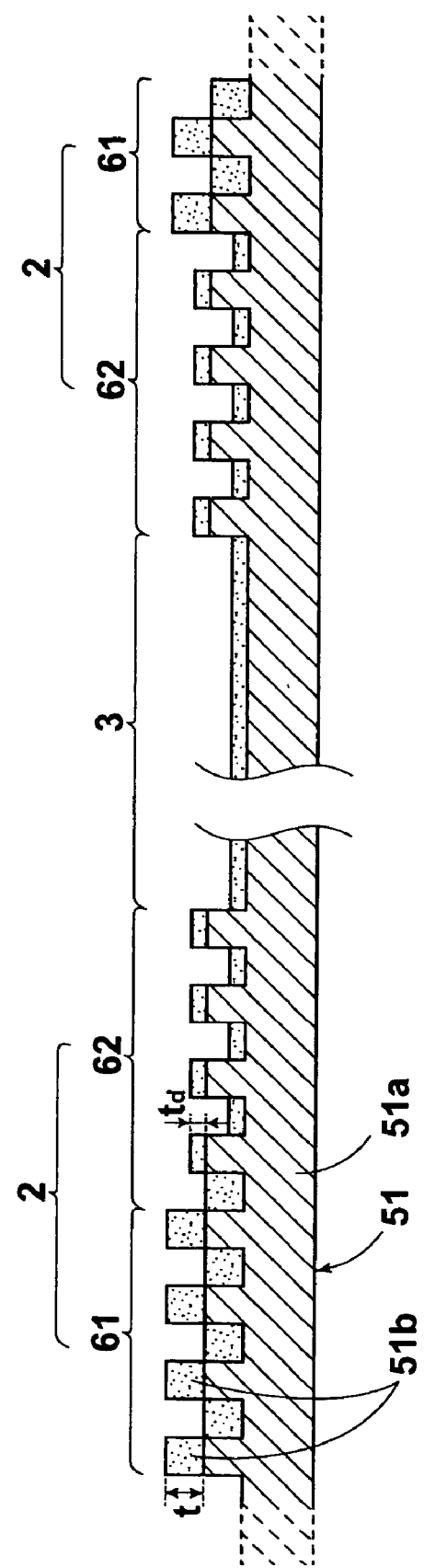

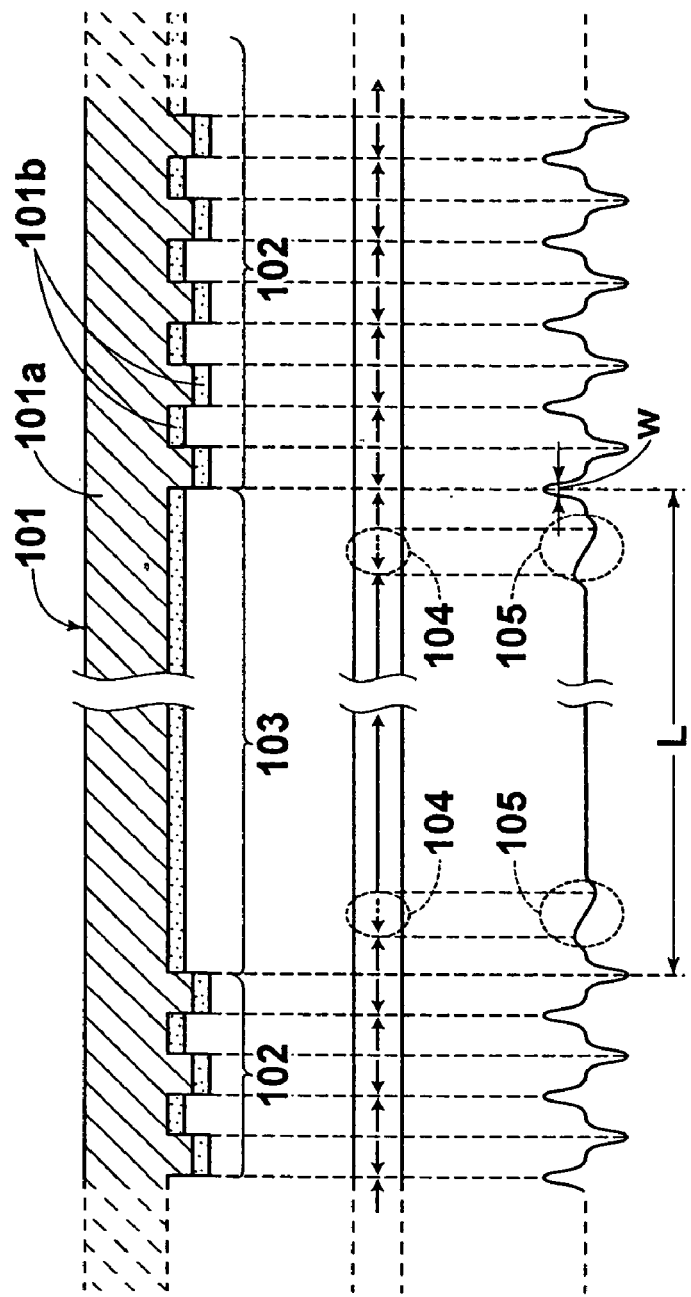

PATTERNED MASTER CARRIER FOR MAGNETIC TRANSFER, MANUFACTURING METHOD THEREOF, MAGNETIC TRANSFER METHOD, RECORDING MEDIUM, AND MAGNETIC RECORDING AND REPRODUCTION APPARATUS

BACKGROUND OF THE INVENTION

1. Field of the Invention

The present invention relates to a patterned master carrier for magnetic transfer including a signal pattern on a surface for magnetically transferring a desired magnetization pattern to a slave medium, a manufacturing method thereof, a magnetic transfer method using the master carrier, a recording medium, and a magnetic recording and reproduction apparatus.

2. Description of the Related Art

A magnetic transfer method is conventionally known, in which a patterned master carrier for magnetic transfer carrying signal information in the form of fine uneven pattern of a magnetic material is in close contact with a slave medium (transfer medium) having a magnetic recording layer for receiving the magnetic transfer, and then a magnetization pattern corresponding to the information carried by the master carrier is transferred to and recorded on the slave medium by applying a magnetic field during the magnetic transfer process. This magnetic transfer method can perform recording statically without changing relative positions between the master carrier and the slave medium. The method also has an advantage of a very short time period required for recording (see U.S. Pat. No. 6,347,016, for example).

Along with the recent development of ultra-fine processing techniques, such as electron beam lithography, it is now possible to pattern signals having minimum bit lengths of 100 nm or below, and to perform one-time writing of signals corresponding to a surface density of a current hard disk device by means of the magnetic transfer.

The above-mentioned U.S. patent and the like have already disclosed the use of this magnetic transfer method for recording a head-positioning servo signal on a magnetic recording medium.

Meanwhile, one of the technical problems in the magnetic transfer method is occurrence of an unclear magnetically recorded portion (reverse magnetization) on the slave medium in the course of signal transfer from the master carrier to the slave medium. Since the subpulse is detected from a readout waveform of the magnetization pattern due to existence of this unclear magnetically recorded portion, there is a possibility of occurrence of an error in a magnetic reproduction apparatus which recognizes the subpulse as a reproduction signal. A method of observing the subpulse caused by this unclear magnetically recorded portion is disclosed in Japanese Unexamined Patent Publication No. 2002-42301 and U.S. patent Laid-Open No. 20020044368, for example.

However, the inventors of the present invention have found out that it is possible to suppress the occurrence of the subpulse effectively by use of a magnetic substrate as a substrate for the master carrier and by means of adjusting transfer conditions such as pressure for close contact between the master carrier and the slave medium, and so on.

However, when a transferred signal is a servo signal, for example, it is difficult to completely eliminate subpulses attributable to unclear magnetically recorded portions, which occur on data area sides of adjacent portions in a track direction of servo areas and the data areas on a slave medium after magnetic transfer. An example will be described with reference to schematic drawings in FIGS. 4A to 4C.

FIGS. 4A to 4C are drawings schematically showing part of a cross section in a track direction of a master carrier, a magnetization pattern of a corresponding portion of a slave medium on which the magnetization pattern is transferred from the master carrier, and a readout waveform to be detected from the magnetization pattern. As shown in FIG. 4A, a master carrier 101 comprises a signal pattern including signal areas 102 where uneven shapes based on servo signals are formed and a flat no-signal area 103. This master carrier 101 includes a substrate 101a made of a magnetic material such as Ni which has uneven shape corresponding to the signal pattern on a surface thereof, and a magnetic layer 101b deposited on the signal pattern surface of the substrate 101a. The magnetization pattern as shown in FIG. 4B is transferred to the slave medium by applying the magnetic field having a reverse orientation to an orientation of direct-current magnetization, subjected in advance to a magnetic recording layer of the slave medium in one orientation along tracks, in a state where the surface of this master carrier 101, where the magnetic layer 101b is formed, is brought into close contact with the magnetic recording layer of the slave medium. In this event, unclear magnetically recorded portions 104 are formed on part of the no-signal area adjacent to the signal areas, whereby a readout waveform as shown in FIG. 4C is detected from the magnetization pattern shown in FIG. 4B. As illustrated therein, subpulses 105 are detected in response to the unclear magnetically recorded portions 104. That is, in a magnetic reproduction apparatus for reproducing the magnetic recording medium, there is a risk of a problem where such subpulses are detected and misrecognized as reproduction signals. For example, subpulses occurring on both ends of a servo area may cause a shift of servo timing mark attributable to misrecognition of timing for a start and an end of a servo signal portion, and may cause an error such as servo tracking incapability.

Note that occurrence of the subpulse is not only limited to the case where the signal pattern is made of servo signals. For example, when the magnetic transfer is performed by use of a master carrier including a signal pattern in which a length L of a sequence of a direct-current signal is supposed to be equal to or longer than about 10 times of a half-width W of a isolated waveform in a readout waveform as shown in FIG. 4C, there is a possibility that a slave medium after the magnetic transfer causes the above-described subpulse in a direct-current signal area in a position immediately before transition from the direct-current signal to the solitary waveform.

SUMMARY OF THE INVENTION

In consideration of the foregoing problems, it is an object of the present invention to provide a patterned master carrier for magnetic transfer for transferring a magnetization pattern, which does not cause problems such as an error attributable to a subpulse upon signal reproduction, to a slave medium.

A patterned master carrier for the magnetic transfer according to the present invention is a patterned master carrier for the magnetic transfer having a signal pattern of a magnetic layer on a surface thereof for magnetically transferring a desired magnetization pattern to a slave medium, the signal pattern of the magnetic layer being formed by an aggregate including signal areas and no-signal areas which are disposed adjacently to one another in a track direction, the signal area having an actual signal pattern and a dummy signal pattern which is different from the actual signal pattern and is adjacent to the no-signal area.

That is, the patterned master carrier for the magnetic transfer according to the present invention includes the signal pattern in which the dummy signal pattern is formed on at least one end in the track direction of the signal area, and the at least one end in the track direction of the actual signal pattern, is not adjacent to the no-signal area.

The "patterned master carrier for magnetic transfer" includes one consisting of a magnetic substrate having an uneven pattern on a surface thereof, one including a substrate having an uneven pattern on a surface thereof and a magnetic layer covering at least on an upper surface of convex portions on the substrate, one including a substrate having an uneven pattern on a surface thereof and a magnetic layer embedded in concave portions of the substrate, one made of a flat substrate covered with a magnetic layer having an uneven pattern of a surface thereof, and the like. That is, the patterned master carrier for the magnetic transfer may be formed into one which has the surface of the uneven pattern shape, or one which has the flat surface by means of embedding the concave portions with the magnetic layer, as long as the master carrier includes the signal pattern made of the magnetic layer at a portion that contacts the transfer medium.

As the substrate of the master carrier, one made of Ni, silicon, a quartz plate, glass, aluminum, ceramics, synthetic resin, or the like can be used, but one made of Ni or one made of alloy containing Ni as a main component is particularly preferable. Moreover, as the magnetic material for the magnetic layer, Co, Co alloy (CoNi, CoNiZr, CoNbTaZr, or the like), Fe, Fe alloy (FeCo, FeCoNi, FeNiMo, FeAlSi, FeAl, or FeTaN), Ni, or Ni alloy (NiFe) can be used, and particularly preferable ones are FeCo and FeCoNi. Note that better transfer can be performed by using, as the magnetic layer provided on the substrate, a magnetic layer of soft magnetic material, semi-hard magnetic material, or the like having a small coercive force. Furthermore, the magnetic layer preferably has a saturation magnetization value higher than that of the saturation magnetization of the substrate.

A method of manufacturing the patterned master carrier for the magnetic transfer according to the present invention is a method of manufacturing a patterned master carrier for the magnetic transfer having a magnetic layer signal pattern on a surface thereof for magnetically transferring a desired magnetization pattern to a slave medium, which includes the steps of forming the magnetic layer signal pattern by an aggregate including signal areas and no-signal areas which are disposed adjacently to one another in a track direction, and forming, in the signal area, an actual signal pattern and a dummy signal pattern which is different from the actual signal pattern and is adjacent to the no-signal area.

Here, the "actual signal pattern" is a pattern which carries information to be actually reproduced. On the other hand, the "dummy signal pattern" is a pattern provided so as to avoid occurrence of an unclear magnetically recorded portion at an adjacent portion, in the track direction, to an actual signal magnetization pattern on the slave medium in order to obtain a desired reproduction signal based on the actual signal pattern.

The signal area in the above-described conventional master carrier is an area where only the actual signal pattern is formed. However, the signal area in the master carrier of the present invention is provided with the dummy signal pattern in addition to the actual signal pattern, which is the area where the uneven pattern necessary for obtaining the desired reproduction signal is formed (including the case where the magnetic layer is embedded in the concave portions of the uneven substrate). Meanwhile, the "no-signal area" is the area other than this signal area, which is usually formed as a flat surface. Here, in the master carrier having the surface formed into the uneven pattern shape, it is also possible to provide a convex portion in the no-signal area for releasing stress applied upon close contact with the slave medium.

A preferred example of the actual signal pattern includes one carrying servo signals. However, in the present invention, the actual signal pattern is not limited only to the servo signals, but may carry various data signals.

Here, the dummy signal pattern includes one formed in accordance with a cycle (or a frequency) which is different from a pattern cycle length (or a basic frequency of a pattern) used as the actual signal pattern, and/or one including a magnetic layer having a thickness which is different from a thickness of the magnetic layer in the actual signal pattern, for example. Note that the pattern cycle length is defined as the distance from a concave portion to another concave portion of the uneven pattern in the track direction or from a convex portion to another convex portion (such as a distance indicated by $\lambda$ in FIG. 2A). It is preferable that the cycle length of the dummy signal pattern is either 1.3 to 3.0 times the maximum value of the cycle length of the actual signal pattern, or 0.3 to 0.7 times a minimum value thereof. In addition, it is desirable that the thickness of the magnetic layer at the dummy signal pattern is 1.5 to 3.0 times, or 0.3 to 0.7 times that of the actual signal pattern. The unclear recording portions, caused by the non-signal regions, are positively reduced, by setting the above ranges. Simultaneously, a high S/N ratio can be secured during readout of the actual signals.

The patterned master carrier for magnetic transfer according to the present invention is produced in the following manner. First, a first original master, having an uneven pattern that corresponds to the signal pattern described above (including cases in which the protrusions and recesses of the uneven pattern are reversed) on its surface is produced. Then, a metal plate having the uneven pattern on its surface is produced by electroforming, employing the first original master.

The first original master having the uneven pattern on its surface may be produced by employing photolithography. Hereinafter, a method will be described wherein the first original master is produced using a silicon wafer. However, other materials, such as a quartz plate and a glass plate, are also employable.

First, a positive working electron beam resist layer is applied to a discoid silicon wafer having a flat surface, by a spin coat method or the like. An electron beam is irradiated on the silicon wafer while it is being rotated. The electron beam is modulated corresponding to the above signal pattern, thereby irradiating the entirety of the resist layer with the above signal pattern. In the case that the signal pattern represents, for example, servo signals utilized by magnetic disks, the electron beam is irradiated in a pattern corresponding to the servo signals. That is, the electron beam is irradiated on the resist layer as circumferentially extending patterns at a portion of each of a plurality of sectors (for example, 200 sectors), which are provided at equidistant intervals on each of a great number of concentric tracks (for example, several tens of thousands of tracks) formed on a magnetic disk. After the entirety of the resist is irradiated in this manner, the irradiated portions of the resist are removed by developing the resist. Thereby, the first original master, which is the silicon wafer having the uneven pattern of protrusive resist and recessed irradiated portions, is obtained.

Electroforming is performed, employing the first master produced in this manner. That is, a thin conductive film formed of metal, such as nickel and silver, is formed on the uneven surface of the first master by sputtering, vapor deposition, or electroless plating. Then, Ni is electroplated to be of a sufficient thickness above the height of the protrusions. Thereafter, the electroplated Ni and the first master are separated. Thereby, a Ni plate (hereinafter, referred to as a "first casting mold"), having an uneven pattern corresponding to servo signals on its surface, is obtained. Note that the protrusions of the uneven pattern on the surface of the first casting mold correspond to the portions of the resist, which were irradiated by the electron beam. The first casting mold, obtained in this manner, may be utilized as the patterned master carrier for magnetic transfer of the present invention as is. Alternatively, a magnetic layer and a protective layer may be provided on the first casting mold in this order, then the first casting mold having these additional layers may be utilized as the patterned master carrier for magnetic transfer of the present invention.

As a further alternative, the first casting mold may be employed as a second original master. That is, further electroplating may be performed to produce a Ni plate (hereinafter, referred to as a "second casting mold") having an uneven pattern on its surface. The second casting mold may be utilized as the patterned master carrier for magnetic transfer according to the present invention as is, or after a magnetic layer and a protective layer are provided on its uneven surface in this order. In this case, it is preferable that: (1) a negative working electron beam resist is utilized, and the electron beam is irradiated as a signal pattern corresponding to servo signals; or (2) a positive working electron beam resist is utilized, and the electron beam is irradiated as a signal pattern inverse to the servo signals, during production of the first original master. If this method is employed, there is an advantage that a plurality of patterned master carriers for magnetic transfer can be produced from the second original master.

It is also possible to utilize the second master as a stamper to mold a resin disk having an uneven surface, using the stamper method. A magnetic layer and a protective layer are provided on the uneven surface of the resin disk in this order, and the resin disk may be utilized as the patterned master carrier for magnetic transfer according to the present invention.

On the other hand, a first original master may be produced in the same manner as that described above, then the surface thereof may be etched. In this case, the resist, which forms the protrusions, function as an etching resist. Therefore, it is possible to selectively etch the surface of the silicon wafer at portions corresponding to the recesses of the uneven pattern. Then, a silicon wafer having the uneven surface on its surface itself can be obtained by removing the resist, which constitutes the protrusions. This silicon wafer may be utilized as a third original master to be electro formed, thereby producing a Ni plate (hereinafter, referred to as a "third casting mold") having the uneven pattern on its surface. The third casting mold may be utilized as the patterned master carrier for magnetic transfer according to the present invention as is, or after a magnetic layer and a protective layer are provided on its uneven surface in this order. This method also enables the production of a plurality of patterned master carriers for magnetic transfer from the third original master.

The heights of the protrusions (depth of the uneven pattern) of the patterned master carrier of the present invention should preferably be set in the range of 50 nm to 800 nm, more preferably in the range of 80 nm to 600 nm. In the case that the uneven pattern represents servo signals, the protrusions are formed so as to be longer in the radial direction than in the circumferential direction. For example, the uneven pattern should have a length of 0.05 µm to 20 µm in the radial direction of the substrate, and 0.05 µm to 5 µm in the circumferential direction thereof. For a pattern bearing information signals that are sample servo signals, it is preferable to select a pattern longer in the radial direction than in the circumferential direction within these ranges.

The magnetic layer is formed on the patterned substrate by depositing a magnetic material by a plating method, or by a vacuum film growth method including a vacuum vapor deposition method, a sputtering method, an ion plating method, and so on. The thickness of the magnetic layer should preferably be set in the range of 50 nm to 500 nm, more preferably in the range of 80 nm to 300 nm.

A protective film such as DLC (viz., diamond-like carbon) of a thickness of 5 nm to 30 nm should preferably be formed on the magnetic layer, and a lubricant layer may further be provided on the magnetic layer. In addition, an adhension strengthening layer such as Si may be disposed between the magnetic layer and the protective film. Lubricant reduces deterioration in durability due to damage by friction when positional shift of the master medium from the slave medium caused in the contacting step is corrected.

Note that the conditions of the cycle length of the actual signal pattern, the thickness of the magnetic layer, and the like usually vary depending on specifications of a magnetic reproduction apparatus for reproducing the signals from the slave medium on which the magnetization pattern is magnetically transferred by use of the master carrier, and on respective channels in the specifications. That is, a frequency range and/or an amplitude range of a waveform which can be converted into a reproduction signal when converting a readout waveform detected from the magnetization pattern of the slave medium with a head into the reproduction signal vary depending on the specifications of the magnetic reproduction apparatus and on the channels. Therefore, the dummy signal pattern varies depending on each signal format of the actual signal pattern. For example, when the actual signal pattern carries a servo signal to be reproduced in an initial format mode in the magnetic reproduction apparatus, the dummy signal pattern to be provided only needs to be a signal for transferring a dummy magnetization pattern which can avoid misrecognition of starting and ending positions of the servo signal on a servo channel.

The magnetic transfer method according to the present invention includes the step of applying the magnetic field to the slave medium and the patterned master carrier for the magnetic transfer in a state where the surface of the patterned master carrier for the magnetic transfer of the present invention is brought into close contact with a surface of the slave medium and thereby transferring the magnetization pattern to the slave medium.

As the slave medium, a disk-shaped magnetic recording medium, such as a hard disk or a high-density flexible disk, having a coated-type magnetic recording layer or a metal-thin-film-type magnetic recording layer can be used.

Note that in the case of a magnetic recording medium having a metal-thin-film-type magnetic recording layer, as magnetic material, Co, Co alloy (CoPtCr, CoCr, CoPtCrTa, CoPtCrNbTa, CoCrB, CoNi, Co/Pd, or the like), Fe, or Fe alloy (FeCo, FePt, or FeCoNi) can be used. The magnetic layer preferably has a large magnetic flux density and magnetic anisotropy in the planar direction in the case of planar recording or in the vertical direction in the case of perpendicular recording because clear transfer can be performed. A preferable thickness of the magnetic layer is greater than or equal to 10 nm and less than or equal to 500 nm, more preferably greater than or equal to 20 nm and less than or equal to 200 nm.

Moreover, it is preferable that a nonmagnetic underlying layer be provided under the magnetic layer (closer to the substrate) in order to give necessary magnetic anisotropy to the magnetic layer. For the underlying layer, Cr, CrTi, CoCr, CrTa, CrMo, NiAl, Ru, Pd, or the like can be used. However, one having a crystal structure and a lattice constant matching those of the magnetic layer provided thereon needs to be selected. A preferable thickness of the nonmagnetic layer is equal to or larger than 10 nm and equal to or smaller than 150 nm, more preferably equal to or larger than 20 nm and equal to or smaller than 80 nm.

Furthermore, in the case of a perpendicular magnetic recording medium, a soft magnetic backing layer may be provided under the nonmagnetic underlying layer in order to stabilize the state of perpendicular magnetization of the magnetic layer and to improve sensitivity at the time of recording and reproduction. For this backing layer, NiFe, CoCr, FeTaC, FeAlSi, or the like can be used. A preferable thickness of the backing layer is equal to or larger than 50 nm and equal to or smaller than 2000 nm, and more preferably equal to or larger than 60 nm and equal to or smaller than 400 nm.

Further, in the case that the slave medium is a hard disk, it is preferable to employ glass or aluminum as the material of the substrate. In the case that the slave medium is a high density flexible disk, it is preferable that a polyester film, such as polyethylene terephthalate or polyethylene naphthalate is employed as the material of the substrate.

A recording medium according to the present invention is a recording medium having a magnetic recording surface for recording a desired magnetization pattern, the magnetization pattern being formed by an aggregate including signal magnetization areas and no-signal magnetization areas which are disposed adjacently to one another in a track direction, and an actual signal magnetization pattern and a dummy magnetization pattern which is different from the actual signal magnetization pattern and is adjacent to the no-signal magnetization area, are formed in the signal magnetization area.

Here, the "signal magnetization area" is an area where magnetization is reversed in accordance with a given pattern, and the "no-signal magnetization area" generally means an area where the magnetization is aligned in a given orientation. However, in this specification, the "no-signal magnetization area" shall include not only the area where the magnetization is aligned in the given orientation but also an area where the orientation of the magnetization is at random without having the given pattern, and an area where the magnetization is unclear.

The "actual signal magnetization pattern" is a pattern which carries information to be actually reproduced. On the other hand, the "dummy magnetization pattern" is a pattern provided so as to avoid occurrence of an unclear magnetically recorded portion at an adjacent portion in the track direction to the actual signal magnetization pattern in order to obtain a desired reproduction signal based on the actual signal magnetization pattern.

Here, the dummy magnetization pattern includes one formed in accordance with a cycle length (or a frequency) which is different from a pattern cycle length (or a basic frequency of a pattern) used as the actual signal magnetization pattern, and/or one formed to generate a magnitude of the magnetization which is different from a magnitude of the magnetization in the actual signal magnetization pattern, for example. Note that the pattern cycle length is defined as a reversing cycle of the magnetization in the track direction (such as the distance indicated by $\lambda$ in FIG. 2A). It is preferable that the pattern cycle length of the dummy magnetization pattern is either 1.3 to 3.0 times a maximum value of the pattern cycle length of the actual signal magnetization pattern, or 0.3 to 0.7 times a minimum value thereof. Alternatively, it is preferable that the magnitude of magnetization of the dummy magnetization pattern is 1.5 to 3.0 times, or 0.3 to 0.7 times that of the actual signal pattern.

Note that the conditions of the pattern cycle length of the actual signal magnetization pattern, the magnitude of the magnetization, and the like generally vary depending on specifications of a magnetic reproduction apparatus for reproducing the signals from the recording medium and on respective channels in the specifications. That is, a frequency range and/or an amplitude range of a waveform which can be converted into a reproduction signal when converting a readout waveform detected from the magnetization pattern with a head into the reproduction signal vary depending on the specifications of the magnetic reproduction apparatus and on the channels. Therefore, the dummy magnetization pattern varies depending on each signal format of the actual signal magnetization pattern. For example, when the actual signal magnetization pattern carries a servo signal to be reproduced in an initial formatting mode in the magnetic reproduction apparatus, the dummy magnetization pattern supposed to be provided only needs to be a signal for transferring the dummy magnetization pattern which can avoid misrecognition of starting and ending positions of the servo signal on a servo channel.

The magnetic recording and reproduction apparatus of the present invention is equipped with a magnetic disk, on which a desired magnetic pattern is recorded, wherein:

the magnetic pattern is formed by:

an aggregate comprising signal magnetized areas and no-signal magnetized areas which are disposed adjacently to one another in a track direction, and an actual signal pattern and a dummy signal pattern, which is different from the actual signal pattern and is adjacent to the no-signal area, formed in the signal area.

The above magnetic recording and reproduction apparatus comprises:

a recording medium;

a reproducing head for reproducing information, which is recorded on the recording medium; and a recording head for recording information on the recording medium; wherein a discoid recording medium according to the present invention is employed as the recording medium.

The patterned master carrier for the magnetic transfer according to the present invention includes the magnetic layer signal pattern formed by the aggregate having the signal areas and the no-signal areas which are disposed adjacently to one another in the track direction, and the actual signal pattern and the dummy signal pattern adjacent to the no-signal area are formed in the signal area. In other words, one end or both ends, in the track direction, of the actual signal pattern are formed so as to be adjacent to the dummy signal patterns instead of the no-signal areas. Therefore, it is possible to avoid occurrence of the unclear magnetically recorded portion on at least one of a starting point and an ending point in the track direction of the actual signal pattern upon the magnetic transfer to the slave medium and thereby to prevent misrecognition of a signal attributable to occurrence of the subpulse upon signal reproduction from the slave medium after the magnetic transfer.

Here, when the servo signal is obtained as the reproduction signal in the patterned master carrier for the magnetic transfer according to the present invention, it is possible to produce the slave medium which effectuates highly accurate tracking servo without misrecognizing the servo signal.

According to the method of manufacturing the patterned master carrier for the magnetic transfer of the present invention, the signal pattern of the magnetic layer is formed by the aggregate including the signal areas and the no-signal areas which are disposed adjacently to one another in the track direction, and the actual signal pattern and the dummy signal pattern adjacent to the no-signal area are formed in the signal area. Therefore, it is possible to obtain the signal pattern of the magnetic layer in which one end or both ends in the track direction of the actual signal pattern are adjacent to the dummy signal patterns instead of the no-signal areas.

According to the magnetic transfer method of the present invention, the magnetization pattern is transferred to the recording medium by use of the patterned master carrier for the magnetic transfer of the present invention. Therefore, no unclear recorded portion is generated at a portion of the recording medium which is adjacent to the actual signal pattern, and misrecognition of a signal attributable to occurrence of the subpulse upon the signal reproduction is thereby avoided.

The magnetic recording medium according to the present invention and the magnetic recording and reproduction apparatus that utilizes it, the magnetic recording medium is formed by the aggregate including the signal magnetization areas and the no-signal magnetization areas which are disposed adjacently to one another in the track direction, and the actual signal magnetization pattern and the dummy signal magnetization pattern, which is different from the actual signal magnetization pattern and is adjacent to the no-signal magnetization area, formed in the signal magnetization area. Therefore, no unclear recorded portion exists in the area adjacent to the actual signal magnetization pattern. Accordingly, misrecognition of a signal attributable to occurrence of the subpulse upon signal reproduction with a magnetic head is thereby avoided. For this reason, the present invention enables accurate tracking, to secure recording and reproduction with high reliability.

BRIEF DESCRIPTION OF THE DRAWINGS

FIG. 2A is a partial cross-sectional view of the master carrier according to the embodiment, FIG. 2B is a schematic diagram of a magnetization pattern on a slave medium, and FIG. 2C is a schematic drawing of a reproduction waveform.

FIG. 3 is a partial cross-sectional view of a master carrier according to another embodiment of the present invention.

FIGS. 4A to 4C are schematic drawings for explaining a problem of the related art.

DESCRIPTION OF THE PREFERRED EMBODIMENTS

Now, embodiments of the present invention will be described with reference to the accompanying drawings.

Figure 1A:
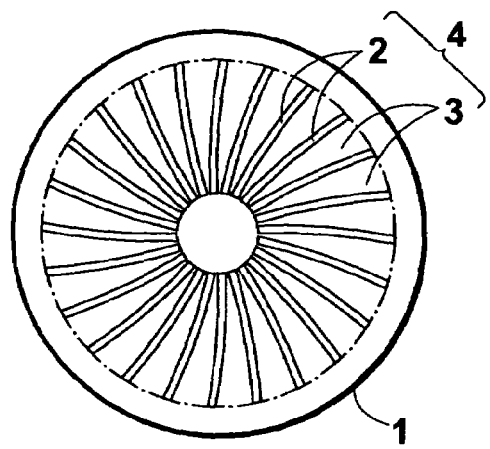
FIG. 1A is a schematic plan view of a master carrier according to an embodiment of the present invention.
Figure 1B:
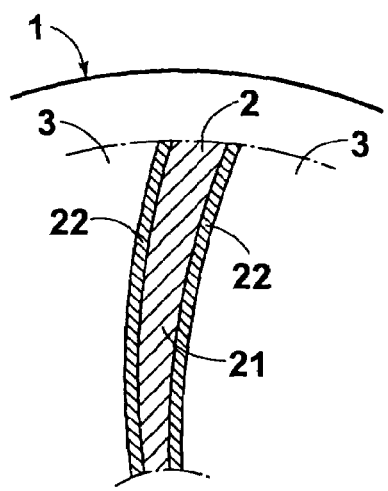
FIG. 1B is a partially enlarged view of the master carrier of FIG. 1A.
Figure 1C:
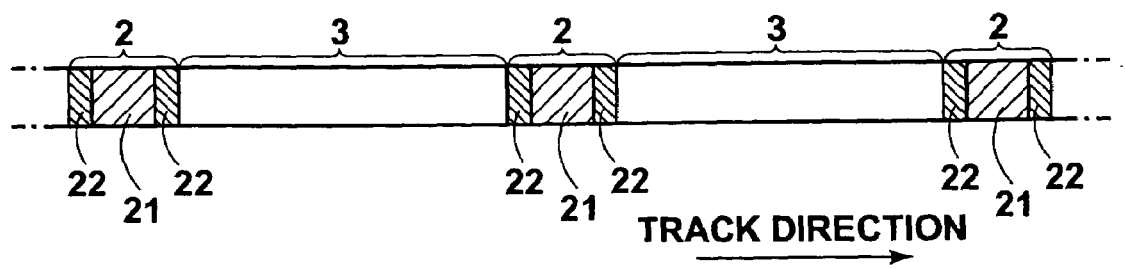
FIG. 1C is a partial cross-sectional view of the master carrier of FIG. 1A.

FIGS. 1A to 1C are drawings schematically showing a patterned master carrier 1 for the magnetic transfer.

As shown in FIG. 1A, a signal pattern 4 of a magnetic layer including signal areas 2 and no-signal areas 3 are formed on a surface of this patterned master carrier 1. Meanwhile, as shown in a partially enlarged view in FIG. 1B, the signal area 2 is provided with an actual signal pattern 21 and dummy signal patterns 22 which are adjacent to the no-signal areas 3. Here, the actual signal pattern 21 carries servo signals. Note that about 60 to 200 signal areas 2 are provided in a track circuit.

As shown in a partially enlarged view along the track direction in FIG. 1C, the dummy signal patterns 22 are formed on both ends, in the track direction, of the actual signal pattern 21. Accordingly, the actual signal pattern 21 is configured not to be adjacent to the no-signal areas 3 in the track direction.

FIG. 2A is a partial cross-sectional view in the track direction of the master carrier shown in FIGS. 1A to 1C, FIG. 2B is a schematic plan view of a magnetization pattern provided on a slave medium which is derived from a portion of the master carrier shown in FIG. 2A as a result of the magnetic transfer, and FIG. 2C is a schematic drawing showing a readout waveform from the magnetization pattern of FIG. 2B.

As shown in FIG. 2A, the master carrier 1 basically includes a substrate 1a having an uneven pattern on one surface, and a magnetic layer 1b. It is satisfactory if the magnetic layer 1b is at least formed on upper surfaces of convex portions. Alternatively, it is also possible to adopt a form in which the magnetic layers are embedded only into concave portions of the substrate 1a.

The dummy signal pattern 22 is formed as an uneven pattern having a smaller cycle as compared to a cycle length of the uneven pattern to be formed as the actual signal pattern 21. Here, a cycle length $\lambda d$ of the dummy signal pattern 22 is set to about one-fourth as compared to a cycle length $\lambda$ of the actual signal pattern 21. As long as the cycle length $\lambda$ of the actual signal pattern 21 is within a range from $\lambda \min \leq \lambda \leq \lambda \max$, the cycle length $\lambda d$ of the dummy signal pattern 22 is not limited to one-fourth of the cycle length $\lambda$. The cycle length $\lambda d$ may be set to either 1.3 to 3.0 times the maximum value $\lambda \max$ of the formation pattern of the actual signal pattern, or 0.3 to 0.7 times the minimum value $\lambda \min$ thereof.

The range of the cycle $\lambda$ of the actual signal pattern 21 (values of $\lambda \max$ and $\lambda \min$ described above) is defined in response to a signal format determined for a servo channel circuit of a magnetic reproduction apparatus for reproducing a magnetic recording medium, on which a servo pattern is magnetically transferred by use of this patterned master carrier. That is, the actual signal pattern is a pattern corresponding to information to be actually reproduced, which is configured to transfer a magnetization pattern reproducible as a reproduction signal in accordance with the signal format transmitted on a servo channel. On the other hand, the dummy signal pattern is formed in a different signal format from the signal format transmitted on the servo channel, which is configured to transfer a magnetization pattern not detectible as a signal in the servo channel circuit to the magnetic recording medium.

The magnetic transfer is performed by subjecting a magnetic recording layer of a planar recording magnetic recording medium, which is the slave medium, to initial direct-current magnetization in one orientation along the track direction in advance, and then applying the magnetic field for the magnetic transfer is applied in a reverse orientation to the initial direct-current magnetization, in a state where the patterned surface of the master carrier is in close contact with the magnetic recording surface of the magnetic recording medium. In this way, the magnetization pattern corresponding to the pattern carried by the master carrier is transferred to the magnetic recording layer of the magnetic recording medium. Here, when the magnetic recording medium has the magnetic recording layers on both sides, the master carriers are brought into close contact with both surfaces simultaneously or one after another and then the magnetic field applied thereto, so that desired magnetization patterns are provided on both surfaces. Meanwhile, in the case of a perpendicular magnetic recording medium instead of the planar magnetic recording medium, the orientation of initial magnetization and the orientation of the magnetic field for the magnetic transfer should be set to a perpendicular direction to the magnetic recording surface.

After the above-described magnetic transfer process, the magnetization pattern as shown in FIG. 2B is transferred from the master carrier having the uneven pattern signals as shown in FIG. 2A to the magnetic recording medium. In an area 12 corresponding to the signal area 2 of the master carrier, a reverse magnetization pattern (a signal magnetization area 12) corresponding to the uneven pattern in the signal area is formed. At an adjacent portion in the track direction of an actual signal magnetization pattern area 15 corresponding to the actual signal pattern 21, a dummy magnetization pattern 16 corresponding to the dummy signal pattern 22 is formed. Meanwhile, an area corresponding to the no-signal area 3 in the master carrier is magnetized in one orientation and thereby constitutes a no-signal magnetization area 13.

Conventionally, an unclear magnetically recorded portion causing a subpulse would occur at the portion in the track direction adjacent to the actual signal magnetization pattern area. However, no unclear magnetically recorded portion occurs in that area because the dummy magnetization pattern is formed therein by use of the master carrier of this embodiment.

It should be noted, however, that an unclear magnetically recorded portion may occur at a portion of the no-signal magnetization area 13 which is adjacent to the area where the dummy magnetization pattern 16 is formed. Nevertheless, such an unclear magnetically recorded portion does not cause an error because the unclear magnetically recorded portion is located in a position remote from the actual signal pattern and is not therefore detected as the reproduction signal.

The readout waveform of the magnetization pattern to be read by a magnetic head of the magnetic reproduction apparatus becomes one which corresponds to the magnetization pattern as shown in FIG. 2C. Whereas the magnetic reproduction apparatus detects the readout waveform as shown in FIG. 2C from the head, the servo channel does not detect a frequency waveform corresponding to the dummy magnetization pattern. In this way, it is possible to detect only the servo pattern as a reproduced servo signal.

As described above, it is also conceivable that the unclear magnetically recorded portion occurs in the area of the no-signal magnetization area corresponding to the no-signal area adjacent to the dummy magnetization pattern. However, a position of occurrence of the subpulse is remote from an edge of the servo pattern due to existence of the dummy magnetization pattern. Accordingly, the unclear magnetically recorded portion will not be detected as the reproduced servo signal and will not adversely affect tracking accuracy.

Now, a magnetic recording and reproduction apparatus loading the magnetic recording medium, which is the slave medium, to which the magnetization pattern is transferred by use of the patterned master carrier for the magnetic transfer according to the present invention, will be briefly described.

The magnetic recording and reproduction apparatus comprises: a reproducing head for reproducing information, which is recorded on a recording medium; and a recording head for recording information on the recording medium. The discoid recording medium according to the present invention is utilized as the recording medium. That is, the magnetic pattern, which is transferred to the recording medium, is formed by an aggregate comprising signal areas and no-signal areas, which are disposed adjacently to one another in a track direction, and the signal areas have an actual signal pattern and a dummy signal pattern, which is different from the actual signal pattern, adjacent to the no-signal area.

A circuit of the magnetic recording and reproduction apparatus includes a servo channel and a data channel. The data channel further includes two channels for reading and writing. These channels are switched as appropriate to transmit the information for reproducing and recording a signal. In the following, one example of operations in an initial format mode of the magnetic recording and reproduction apparatus will be described.

Firstly, in the circuit, the servo signal is read out with the circuit being switched to the servo channel. After detecting completion of a servo area, the circuit is switched to the write channel of the data channel. Here, completion of the servo area is either detected from the reproduction signal or managed by time passing from detection of a servo clock. In this state, format recording is performed on a data portion. Thereafter, the circuit is switched from the data channel to the servo channel, and reading of the servo signal starting from detection of a front edge of the servo signal is performed again. The initial formatting is performed on all sectors and all tracks by repeating the above-described operations.

In this case, if a subpulse is generated at a portion of the data area immediately precedent to the servo area when the circuit is switched from the data channel to the servo channel to detect the front edge of the servo signal, the front edge of the servo signal may be misdetected due to the subpulse. However, in this embodiment, a dummy waveform in a signal format not transmitted to on the servo channel is detected at the portion of the data area adjacent to the front edge of the servo signal. In this way, misdetection can be prevented.

Meanwhile, in the case of using the magnetic recording and reproduction apparatus configured to manage completion of the servo area by the time passing from the detection of the servo clock, it is possible to provide the dummy signal pattern only on a starting edge side in the track direction of the servo area, and an ending edge of the servo area in the track direction may be adjacent to the no-signal area.

Moreover, it is also possible to provide a convex portion in the no-signal area 3 shown in FIG. 1A for releasing stress applied to the asperities of the uneven pattern in the signal area upon close contact with the slave medium.

Although the master carrier of this embodiment is described on the premise of transferring the servo signals, the master carrier of the present invention can transfer not only the servo signals but also various data signals as transfer signals.

Moreover, this embodiment is described on the premise that the reproduction signal is the servo signal and the dummy signal pattern is formed into the pattern not reproducible by the servo channel. On the other hand, when the reproduction signal is a data signal, the dummy signal pattern should be formed into a pattern not reproducible by the data channel. As described above, the signal format of the servo signal is generally different from the signal format of the data signal. In other words, the signal format to be transmitted on the servo channel of the magnetic reproduction apparatus and the signal format to be transmitted on the data channel thereof are different from each other. Accordingly, it is necessary to modify the dummy signal pattern depending on the purpose. Moreover, the signal formats also vary depending on the specifications of each magnetic recording and reproduction apparatus. Therefore, it is necessary to form the actual signal pattern and the dummy signal pattern depending on the purpose. Note that the signal format is determined mainly by a frequency and amplitude of the readout waveform, and that the portion of the readout waveform satisfying a given frequency range and a given amplitude range is detected as the reproduction signal.

The above-described embodiment is the example in which the dummy signal pattern has the cycle length (or the frequency) different from the cycle length (or the basic frequency) of the actual signal pattern. However, the pattern different from the actual signal pattern is not limited to the pattern having the different cycle length. For example, as the dummy signal pattern, it is possible to form a pattern having a thinner magnetic layer than the magnetic layer of the actual signal pattern.

FIG. 3 shows a partial cross section along a track direction of a patterned master carrier 51 for the magnetic transfer according to another embodiment. The master carrier 51 includes a substrate 51a having an uneven pattern on a surface thereof, and a magnetic layer 51b formed on the substrate 51a. Here, an actual signal pattern 61 and a dummy signal pattern 62 formed in a signal area 2 have the same cycle length of the uneven shape. However, a thickness t of the magnetic layer 51b on a convex portion of the magnetic signal pattern 62 is different from a thickness td of the magnetic layer on a convex portion of the dummy signal pattern 62. Here, the thickness td is set to about half or less than the thickness t. Note that it is preferable for the thickness of the magnetic layer at the dummy signal pattern to be 1.5 to 3.0 times, or 0.3 to 0.7 times that of the actual signal pattern.

When the magnetic transfer is performed by use of such a master carrier 51, a waveform having smaller amplitude than a portion of the actual signal magnetization pattern is obtained as the readout waveform from the dummy magnetization pattern of the slave medium after the magnetic transfer. This amplitude is smaller than the amplitude range to be detected as the reproduction signal, and is therefore not detected as the reproduction signal. Accordingly, such a dummy signal pattern can also prevent a problem of occurrence of the subpulses on both ends of the actual signal and resultant misdetection of the subpulses as false signals.

What is claimed is:

1. A patterned master carrier for magnetic transfer having a signal pattern of a magnetic layer on a surface thereof for magnetically transferring a desired magnetization pattern to a slave medium, wherein the magnetic layer signal pattern is formed by an aggregate comprising signal areas and no-signal areas which are disposed adjacently to one another in a track direction, and an actual signal pattern and a dummy signal pattern, which is different from the actual signal pattern and is adjacent to the no-signal area, are formed in the signal area.

2. The patterned master carrier for the magnetic transfer according to claim 1, wherein the actual signal pattern carries a servo signal.

3. The patterned master carrier for the magnetic transfer according to claim 1, wherein the dummy signal pattern is formed in a different cycle from a cycle length of the actual signal pattern.

4. The patterned master carrier for the magnetic transfer according to claim 1, wherein a thickness of a magnetic layer of the dummy signal pattern is different from a thickness of a magnetic layer of the actual signal pattern.

5. The patterned master carrier for the magnetic transfer according to claim 2, wherein the dummy signal pattern is formed in a different cycle from a cycle length of the actual signal pattern.

6. The patterned master carrier for the magnetic transfer according to claim 2, wherein a thickness of a magnetic layer of the dummy signal pattern is different from a thickness of a magnetic layer of the actual signal pattern.

7. A patterned master carrier for the magnetic transfer according to claim 3, wherein the value of the cycle length of the dummy signal pattern is 1.3 to 3 times the maximum signal value of the cycle length of the actual signal pattern.

8. A patterned master carrier for the magnetic transfer according to claim 3, wherein the value of the cycle length of the dummy signal pattern is 0.3 to 0.7 times the minimum signal value of the cycle length of the actual signal pattern.

9. A patterned master carrier for the magnetic transfer according to claim 5, wherein the value of the cycle length of the dummy signal pattern is 1.3 to 3 times the maximum signal value of the cycle length of the actual signal pattern.

10. A patterned master carrier for the magnetic transfer according to claim 5, wherein the value of the cycle length of the dummy signal pattern is 0.3 to 0.7 times the minimum signal value of the cycle length of the actual signal pattern.

11. A patterned master carrier for the magnetic transfer according to claim 4, wherein the thickness of the dummy signal pattern is 1.5 to 3 times the thickness of the actual signal pattern.

12. A patterned master carrier for the magnetic transfer according to claim 4, wherein the thickness of the dummy signal pattern is 0.3 to 0.7 times the thickness of the actual signal pattern.

13. A patterned master carrier for the magnetic transfer according to claim 6, wherein the thickness of the dummy signal pattern is 1.5 to 3 times the thickness of the actual signal pattern.

14. A patterned master carrier for the magnetic transfer according to claim 6, wherein the thickness of the dummy signal pattern is 0.3 to 0.7 times the thickness of the actual signal pattern.

15. A patterned master carrier according to claim 1, wherein the dummy signal pattern is disposed on both sides of the actual signal pattern to be adjacent to each non-signal area.

16. A patterned master carrier according to claim 1, wherein the dummy signal pattern comprises a low-level magnetization which is not detectable by a reading circuit for reading the actual signal pattern.

17. A method of manufacturing a patterned master carrier for the magnetic transfer having a magnetic layer signal pattern on a surface thereof for magnetically transferring a desired magnetization pattern to a slave medium, the method comprising the steps of:
forming the signal pattern of the magnetic layer by an aggregate including signal areas and no-signal areas, which are disposed adjacently to one another in a track direction, and
forming, in the signal area, an actual signal pattern and a dummy signal pattern, which is different from the actual signal pattern and is adjacent to the no-signal area.

18. A magnetic transfer method comprising the step of:
applying the magnetic field to a slave medium and a patterned master carrier for the magnetic transfer, in a state where a surface of the patterned master carrier for the magnetic transfer is brought into close contact with a magnetic recording surface of the slave medium, and thereby transferring a magnetization pattern to the slave medium, the patterned master carrier for the magnetic transfer having the signal pattern of the magnetic layer on the surface thereof for magnetically transferring a desired magnetization pattern to the slave medium, the magnetic layer signal pattern being formed by an aggregate comprising signal areas and no-signal areas, which are disposed adjacently to one another in a track direction, and the signal areas having an actual signal pattern and a dummy signal pattern, which is different from the actual signal pattern and is adjacent to the no-signal area.

19. The magnetic transfer method according to claim 18, wherein the patterned master carrier for the magnetic transfer carries a servo signal as the actual signal pattern.

20. A magnetic recording medium having a magnetized pattern,
wherein the magnetization pattern is formed by an aggregate comprising signal magnetization areas and no-signal magnetization areas, which are disposed adjacently to one another in a track direction, and
an actual signal magnetization pattern and a dummy signal magnetization pattern, which is different from the actual signal magnetization pattern and is adjacent to the no-signal magnetization area, are formed in the signal magnetization area.

21. The recording medium according to claim 20, wherein the actual signal magnetized pattern carries a servo signal.

22. A magnetic recording and reproduction apparatus comprising:
a magnetic disk having a desired magnetization pattern thereon;
a reproducing head for reproducing information, which is recorded on the magnetic disk; and
a recording head for recording information on the magnetic disk; wherein the magnetization pattern is formed by an aggregate comprising signal areas and no-signal areas which are disposed adjacently to one another in a track direction; and an actual signal pattern and a dummy signal pattern which is different from the actual signal pattern and is adjacent to the no-signal area, are formed in the signal area.

* * * * *